May 9, 1950  D. R. LEMMERMAN  2,507,167
ROTARY IMPACT TYPE TURNING TOOL
Filed Dec. 20, 1946
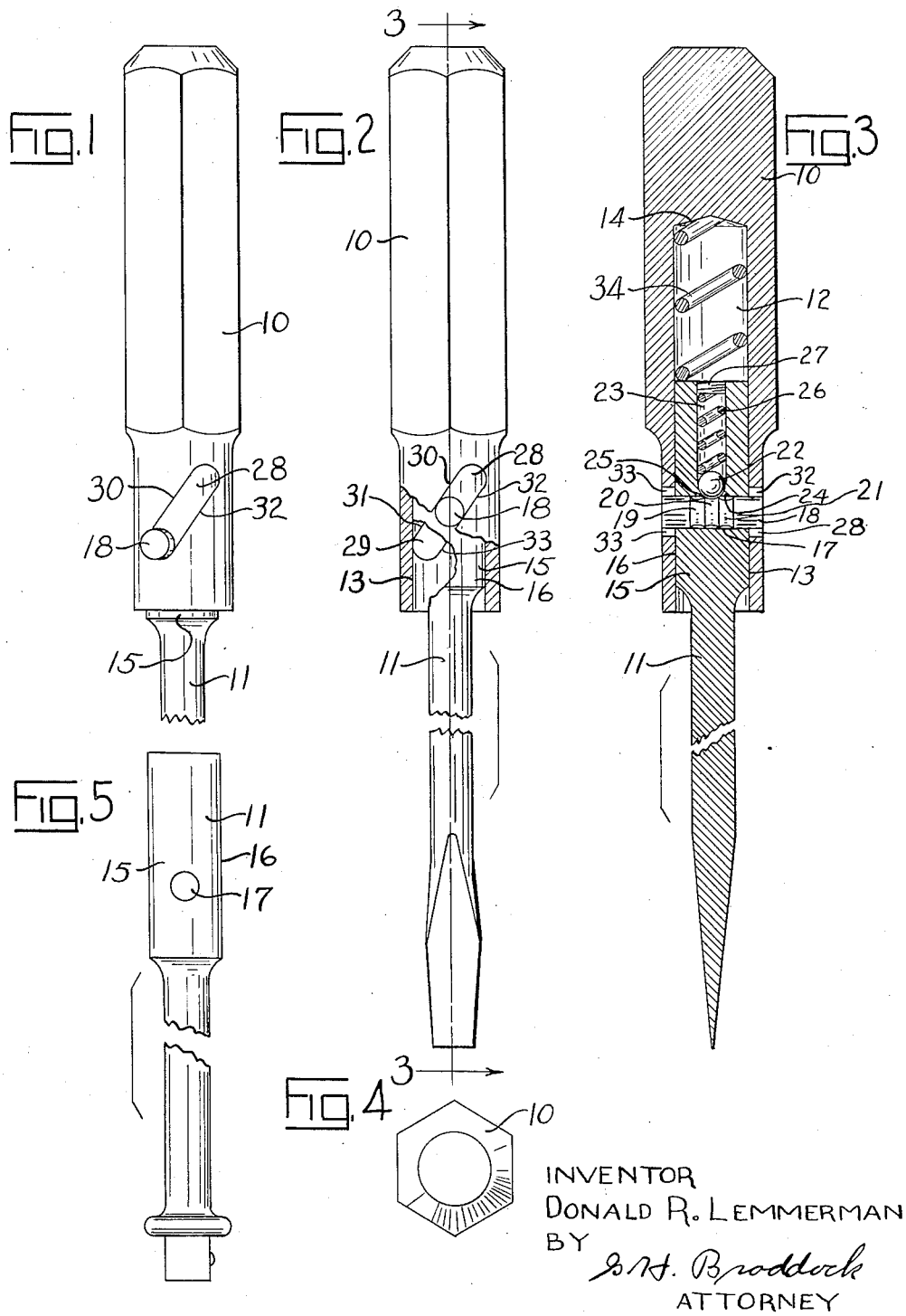
INVENTOR
DONALD R. LEMMERMAN
BY
*D. H. Braddock*
ATTORNEY Patented May 9, 1950

2,507,167

UNITED STATES PATENT OFFICE 2,507,167

ROTARY IMPACT TYPE TURNING TOOL

Donald Richard Lemmerman, Minneapolis, Minn.

Application December 20, 1946, Serial No. 717,412

2 Claims. (Cl. 145—50)

This invention has relation to a tool adapted to be applied to use for various purposes but which has been devised to be more especially useful for seating or tightening or loosening or unseating screws, bolts, nuts, etc.

An object of the invention is to provide a tool of the present character which will be of novel and improved construction.

A further object is to provide a seating and unseating tool, adapted to be employed to fasten down and release articles such as screws, bolts, nuts, etc., wherein will be incorporated desirable and improved features and characteristics of construction novel both as individual entities of the seating and unseating tool and in combination with each other.

And a further object is to provide a new and improved tool for tightening and loosening articles such as screws, bolts, nuts, etc., of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawing forming a part of this specification:

Fig. 1 is a side elevational view, partially broken away, of a seating and unseating tool made according to the invention;

Fig. 2 is a side elevational view, partially in section and partially broken away, of a seating and unseating tool as when constituted as an ordinary screw driver;

Fig. 3 is a longitudinal sectional view, taken on line 3—3 in Fig. 2;

Fig. 4 is an end elevational view of the seating and unseating tool as it would appear from the top of the sheet in either Fig. 1 or Fig. 2; and Fig. 5 is a side elevational view of a socket wrench shank or bit capable of being employed as a part of a seating and unseating tool including features and characteristics of the invention;

With respect to the drawing and the numerals of reference thereon, 10 denotes a body member or driver and 11 indicates an object engaging shank or bit of the new and improved seating and unseating tool. As disclosed in Figs. 2 and 3 the shank or bit is constituted as a screw driver shank or bit, and as shown in Fig. 4 the shank or bit is constituted as a socket wrench shank or bit. Both the body member or driver 10 and the shank or bit 11 of course will be composed of metal or material suitable to the purposes of the seating and unseating tool.

The body member or driver 10 is constituted as a comparatively massive entity of polygonal configuration having a longitudinally extending concavity 12 which opens to the inner end of said body member or driver and is defined or bounded by an internal cylindrical surface 13 of the body member or driver coincident with the length of the concavity and an internal transverse surface 14 of said body member or driver at the base or bottom of said concavity.

The shank or bit 11 is constituted as an elongated element having a cylindrical head or attachment end portion 15 adapted to be snugly fitted into the longitudinally extending concavity 12 of the body member or driver 10 in such manner that an external cylindrical surface 16 of said cylindrical head or attachment end portion will be capable of having both rotative and longitudinal sliding movement within and relative to said body member or driver.

The cylindrical head or attachment end portion 15 of the shank or bit 11 includes a transversely extending guideway 17 adapted to snugly, slidably receive a connecting pin 18 of the seating and unseating tool. Said connecting pin 18 is as shown of cylindrical conformation, and of a length somewhat greater than a measurement representing the dimension of the diameter of said cylindrical head or attachment end portion 15. The connecting pin 18 is mounted in the transverse guideway 17 to be capable of being situated so that its opposite end portions project outwardly to equal extent from diametrically opposite sides of the cylindrical head or attachment end portion 15 as said connecting pin is disclosed in Fig. 3 of the drawing, or situated so that either end of the connecting pin selectively can be situated within the confines of said cylindrical head or attachment end portion 15 at one side thereof while the opposite end portion projects to greater extent than in said Fig. 3 from the other or opposite side of the cylindrical head or attachment end portion. Stated otherwise, the connecting pin 18 is adapted to be selectively detachably fastened in three different operative positions. A first operative position for said connecting pin is as disclosed in Fig. 3 where the connecting pin is shown as situated so that its midlength is at the longitudinal center of the cylindrical head or attachment end portion 15 and its opposite end portions extend to equal distance beyond diametrically opposite sides of said cylindrical head or attachment end portion, a second operative position for said connecting pin is one in which the left end of the connecting pin is within the confines of the left side of the cylindrical head or attachment end portion 15 and the right end portion of said connecting pin extends to greater distance beyond the right side of said cylindrical head or attachment end portion than in said Fig. 3, and a third operative position for the connecting pin is one in which the right end of said connecting pin is within the confines of the right side of the cylindrical head or attachment end portion 15 and the left end portion of the connecting pin extends to greater distance beyond the left side of said cylindrical head or attachment end portion than in Fig. 3.

The connecting pin 18 includes circumferentially extending notches, denoted 19, 20 and 21, respectively, which are situated in adjacent relation to each other along an intermediate portion of the length of and arranged perpendicularly to said connecting pin. The central circumferentially extending notch 20 is as shown at the midlength of the connecting pin and the circumferentially extending notches 19 and 21 are at either side of said central circumferentially extending notch 20.

The cylindrical head or attachment end portion 15 of the shank or bit 11 supports an element, constituted as a metal ball 22 in the disclosure as made, for detachably fastening the connecting pin 18 in any one of the three different operative positions said connecting pin is capable of assuming. More explicity, said cylindrical head or attachment end portion 15 includes a longitudinally extending well or pocket 23, situated axially of the shank or bit 11 and opening to its inner end. The metal ball 22 is adapted to be received in the well or pocket 23 in such manner that said metal ball will be engaged against a conical base 24 of said well or pocket with a part of the surface of the metal ball projecting through a reduced opening 25 contiguous with the guideway 17 and surrounded by said conical base 24. A relatively small compression coil spring 26 within the well or pocket 23, between said metal ball 22 and a plug 27 in said well or pocket, is adapted to resiliently urge the metal ball to seated position in one of the notches 19, 20 or 21, as the case may be. The construction and arrangement will be such that the metal ball 22 will become released from a notch in which seated in response to manual sliding movement of the connecting pin 18 in either direction and become seated in the next adjacent notch.

The inner end portion of the body member or drive 10 includes obliquely disposed, duplicate, elongated slots, indicated 28 and 29, respectively, which are situated at diametrically opposite sides of the longitudinally extending concavity 12. Said obliquely disposed, duplicate, elongated slots 28 and 29 slant in the same direction relative to said body member or driver 10 and lie in a single plane situated at right angle relation to the body member or driver in oblique relation to its longitudinal axis. The inner ends of the obliquely disposed, duplicate, elongated slots 28, 29 terminate in a single plane situated at right angle relation to said body member or driver 10 and its longitudinal axis, as do also the outer ends of said obliquely disposed, duplicate, elongated slots 28, 29.

Each of the elongated slots 28 and 29 is of width about equal to a measurement representing the dimension of the diameter of the connecting pin 18 to be capable of snugly receiving an adjacent end portion of said connecting pin. The elongated slots 28 and 29 are defined or bounded at their outer or upper sides by straight edge camming surfaces, represented 30 and 31, respectively, and at their inner or lower sides by straight edge follower surfaces, indicated 32 and 33, respectively. The straight edge camming and follower surfaces 30 and 32 are in parallel relation, as are also the straight edge camming and follower surfaces 31 and 33.

A comparatively large compression coil spring 34 within the longitudinally extending concavity 12 and having one of its ends engaged against the internal transverse surface 14 of the body member or driver 10 and its other end engaged against the inner or upper end of the cylindrical head or attachment end portion 15 of the shank or bit 11 is for urging said body member or driver and said shank or bit to be moved in direction away from each other.

In Fig. 3 of the drawings the opposite end portions of the connecting pin 18 are disclosed as situated within the elongated slots 28 and 29 thus to cause the shank or bit 11 to be retained in fixed relation to the body member or driver 10 and the tool to be capable of use as an ordinary screw driver; or as an ordinary wrench in an instance when a shank or bit as disclosed in Fig. 5 is substituted for the shank or bit as shown in said Fig. 3. It will be apparent that the tendency of the comparatively large compression coil spring 34 to move the shank or bit 11 away from the body member or driver 10 when said shank or bit is retained in said body member or driver in the manner as shown in Fig. 3 will be resisted by reason of the fact that the opposite end portions of the connecting pin 18 are engaged against the obliquely disposed, straight follower surfaces 32 and 33 at the midlengths of said follower surfaces, and that tendency of manual force exerted in practical use of the tool to move the shank or bit toward the body member or driver when retained as in said Fig. 3 will be resisted by reason of the fact that the opposite end portions of said connecting pin are engaged against the obliquely disposed, straight camming surfaces 30 and 31 at the midlengths of said camming surfaces.

Evidently, with adjustment of the connecting pin 18 toward either right or left in Fig. 3 to cause one of its ends to be released from the corresponding elongated slot, 28 or 29 as the case may be, the compression coil spring 34 will act to cause the shank or bit 11 to be moved in direction away from the body member or driver 10 to extent causing said connecting pin to be moved to the outer or lower limit of the elongated slot in which the connecting pin was permitted to remain.

In Fig. 1 of the drawings the connecting pin 18 is disclosed as when removed from the elongated slot 29 and situated at the outer limit of the elongated slot 28 by reason of resiliency of the compression coil spring 34.

It will be apparent that a hammer blow of some intensity struck against the outer or upper end of the body member or driver 10, while the connecting pin 18 is situated at the lower limit of the elongated slot 28 and clear of the elongated slot 29 with the shank or bit 11 engaged against an object, such as a screw, bolt, nut, etc., intended to be turned, will not only cause the compression coil spring 34 to be collapsed but also will cause the straight camming surface 30 to be forcibly slid downwardly along said connecting pin thus to jarringly force said shank or bit to have tendency toward turning movement adapted to accomplish seating or unseating action upon said object, depending upon whether its thread, or equivalent, is right or left. Also it will be apparent that the type of action as just described will occur when a hammer blow is struck against the body member or driver while the connecting pin is situated at the lower limit of the elongated slot 29 and clear of the elongated slot 28, but the turning tendency will be in opposite or reverse direction by reason of forcible sliding of the straight camming 31 downwardly along the connecting pin.

What is claimed is:

1. A tool of the character described comprising a driver having a circular socket extending inwardly from one end, a shank having a cylindrical end portion snugly fitted into said socket to be capable of having a rotative and longitudinal movement relative to said driver, and a connecting pin mounted for longitudinal movement in and of greater length than a transverse guideway through said end portion of the shank, said driver having obliquely disposed, elongated slots one a right spiral and the other a left spiral situated at diametrically opposed positions on said driver and opening into said socket, all side surfaces of said right and left spiral slots being alined in a direction transversely of the longitudinal axis of the socket, and said connecting pin being manually adjustable to simultaneously situate the outer ends thereof in said right and left spiral slots, or to situate one end in said right spiral slot with the opposite end positioned within the confines of the cylindrical end portion, or to situate said opposite end in said left spiral slot with said one end positioned within the confines of said cylindrical end portion.

2. The combination as specified in claim 1, and a compression spring in said socket resiliently urging said driver and said shank in direction away from each other.

DONALD RICHARD LEMMERMAN.

REFERENCES CITED

The following references are of record in the file of this patent:

UNITED STATES PATENTS

| Number | Name | Date |
| --- | --- | --- |
| 1,731,979 | Krummel | Oct. 15, 1929 |
| 1,743,505 | Turgeon | Jan. 14, 1930 |

FOREIGN PATENTS

| Number | Country | Date |
| --- | --- | --- |
| 803,270 | France | June 29, 1936 |
| 343,400 | Italy | Sept. 28, 1936 |